United States Patent
Liu et al.

(10) Patent No.: US 8,107,328 B1
(45) Date of Patent: Jan. 31, 2012

(54) METHOD AND APPARATUS FOR CALIBRATING OPTICAL RECORDING SYSTEM

(75) Inventors: Jingfeng Liu, Longmont, CO (US); Zachary Keirn, Loveland, CO (US)

(73) Assignee: Marvell International Ltd., Hamilton (BM)

( * ) Notice: Subject to any disclaimer, the term of this patent is extended or adjusted under 35 U.S.C. 154(b) by 358 days.

(21) Appl. No.: 12/285,993

(22) Filed: Oct. 17, 2008

Related U.S. Application Data (60) Provisional application No. 60/981,623, filed on Oct. 23, 2007.

(51) Int. Cl.
*G11B 7/00* (2006.01)

(52) U.S. Cl. .................................. 369/44.13

(58) Field of Classification Search .............. None
See application file for complete search history.

(56) References Cited

U.S. PATENT DOCUMENTS

| | | | | |
|---|---|---|---|---|
| 6,751,270 B1 * | 6/2004 | Choi et al. | ............ | 375/326 |
| 7,400,561 B2 * | 7/2008 | Serrano et al. | ............ | 369/47.28 |
| 7,460,451 B2 * | 12/2008 | Baba | ............ | 369/47.28 |
| 7,817,511 B2 * | 10/2010 | Kobayashi | ............ | 369/47.28 |
| 2006/0126454 A1 * | 6/2006 | Serrano et al. | ............ | 369/44.13 |

OTHER PUBLICATIONS

White Paper Disc Blu-ray Disc Format, 1.A Physical Format Specifications for BD-RE, $2^{nd}$ A Edition, Feb. 2006.
ECMA International, Standard ECMA-337, Data Interchange on 120 mm and 80 mm Optical Disk using +RW Format—Capacity: 4.7 and 1.46 Gbytes per side, $3^{rd}$ Edition, Dec. 2005.
ECMA International, Standard ECMA-349, Data Interchange on 120 mm and 80 mm Optical Disk using +R Format—Capacity: 4.7 and 1.46 Gbytes per side, $3^{rd}$ Edition, Dec. 2005.
ECMA International, Standard ECMA-359, 80 mm (1,46 Gbytes preside) and 120 mm (4,70 Gbytes per side) DVD Recordable Disk (DVD-R), $1^{st}$ Edition, Dec. 2004.
ECMA, Standard ECMA-338, 80 mm (1,46 Gbytes preside) and 120 mm (4,70 Gbytes per side) DVD Re-Recordable Disk (DVD-RW), Dec. 2002.

\* cited by examiner

*Primary Examiner* — Will J Klimowicz
*Assistant Examiner* — Mark Fischer (57) ABSTRACT

Aspects of the disclosure provide a method for efficiently calibrating an optical recording device. The method can include receiving a first signal corresponding to a wobbled track of a memory medium, phase-locking a second signal to the first signal, the second signal being used to extract embedded information in the wobbled track, and determining an optimum setting of the optical recording device based on a locking quality of the first signal and the second signal.

16 Claims, 12 Drawing Sheets

METHOD AND APPARATUS FOR CALIBRATING OPTICAL RECORDING SYSTEM

INCORPORATION BY REFERENCE

This application claims the benefit of U.S. Provisional Application No. 60/981,623, "QUALITY METRIC FOR WOBBLE CHANNEL IN OPTICAL RECORDING" filed on Oct. 23, 2007, which is incorporated herein by reference in its entirety.

BACKGROUND

A memory medium may wobble a recording track to embed timing and address information. The timing and address information can assist an optical recording device to record data at appropriate locations of the wobbled recording track. The optical recording device can include an optical pick-up unit coupled with a wobble channel to extract the timing and address information. The optical pick-up unit can generate a wobble signal corresponding to the wobbled recording track, and the wobble channel can extract the timing and address information from the wobble signal. Generally, the optical pick-up unit and the wobble channel can be tunable according to various settings. An optimum setting, which can enable the optical pick-up unit and the wobble channel to read and extract the timing and address information with a reduced number of errors, can be determined according to a calibration method.

SUMMARY

Aspects of the disclosure can provide a method for efficiently calibrating an optical recording device. The method can include receiving a first signal corresponding to a wobbled track of a memory medium, phase-locking a second signal to the first signal, the second signal being used to extract embedded information in the wobbled track, and determining an optimum setting of the optical recording device based on a locking quality of the first signal and the second signal.

Further, the method can include configuring the optical recording device according to a plurality of settings respectively, measuring quality metric values that represent the locking quality of the first signal and the second signal corresponding to the plurality of settings, respectively, and determining the optimum setting from the plurality of settings based on the quality metric values.

According to an aspect of the disclosure, the plurality of settings can include at least one of optical pickup unit (OPU) settings and wobble channel settings. More specifically, the plurality of settings can include at least one of phase update gain, frequency update gain, attack-rate and decay-rate.

To measure the quality metric, the method can further include obtaining an absolute value of a phase error of the first signal and the second signal, comparing the absolute value to a threshold, and counting a number of occurrences that the absolute value exceeds the threshold.

Alternatively, the method can include obtaining an in-phase component of a phase error of the first signal and the second signal, comparing the in-phase component of the phase error to a threshold, and counting a number of occurrence that the in-phase component exceeds the threshold. In an embodiment, the method may include calculating an absolute value of the in-phase component, and comparing the absolute value of the in-phase component to a threshold.

Similarly, the method can include obtaining a quadrature component of a phase error of the first signal and the second signal, comparing the quadrature component of the phase error to a threshold, and counting a number of occurrences that the quadrature component exceeds the threshold. In an embodiment, the method can include calculating an absolute value of the quadrature component, and comparing the absolute value of the quadrature component to a threshold.

According to the disclosure, the method can be applied to at least one of CD, DVD-R, DVD-RW, DVD+R, DVD+RW, HD-DVD and Blu-Ray. In addition, the wobbled track can embed information in the form of at least one of wobble phase modulation and land pre-pits.

Additionally, the method can include storing the optimum setting for future use with the corresponding memory medium.

Aspects of the disclosure can provide a method of recording using an optical recording device. The method can include identifying a memory medium, obtaining an optimum setting corresponding to the identified memory medium, and configuring the optical recording device according to the optimum setting. The optimum setting can be determined based on a calibration method. The calibration method can include receiving a first signal corresponding to a wobbled track of a calibration memory medium, phase-locking a second signal to the first signal, and determining the optimum setting based on a locking quality of the first signal and the second signal.

Aspects of the disclosure can provide an optical drive. The optical drive can include an optical pick-up unit configured to generate a first signal corresponding to a wobbled track of a memory medium, a wobble channel configured to receive the first signal and phase-lock a second signal to the first signal, the second signal being used to extract embedded information in the wobbled track, and a memory device configured to store an optimum setting corresponding to the memory medium, the optimum setting being determined based on a locking quality of the first signal and the second signal.

Aspects of the disclosure can provide an integrated circuit (IC) chip. The IC chip can include a timing loop module configured to receive a first signal corresponding to a wobbled track of a memory medium, and phase-lock a second signal to the first signal, the second signal being used to extract embedded information in the wobbled track, and a quality metric unit coupled to the timing loop, the quality metric unit being configured to measure a quality metric value based on a phase error of the first signal and the second signal.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
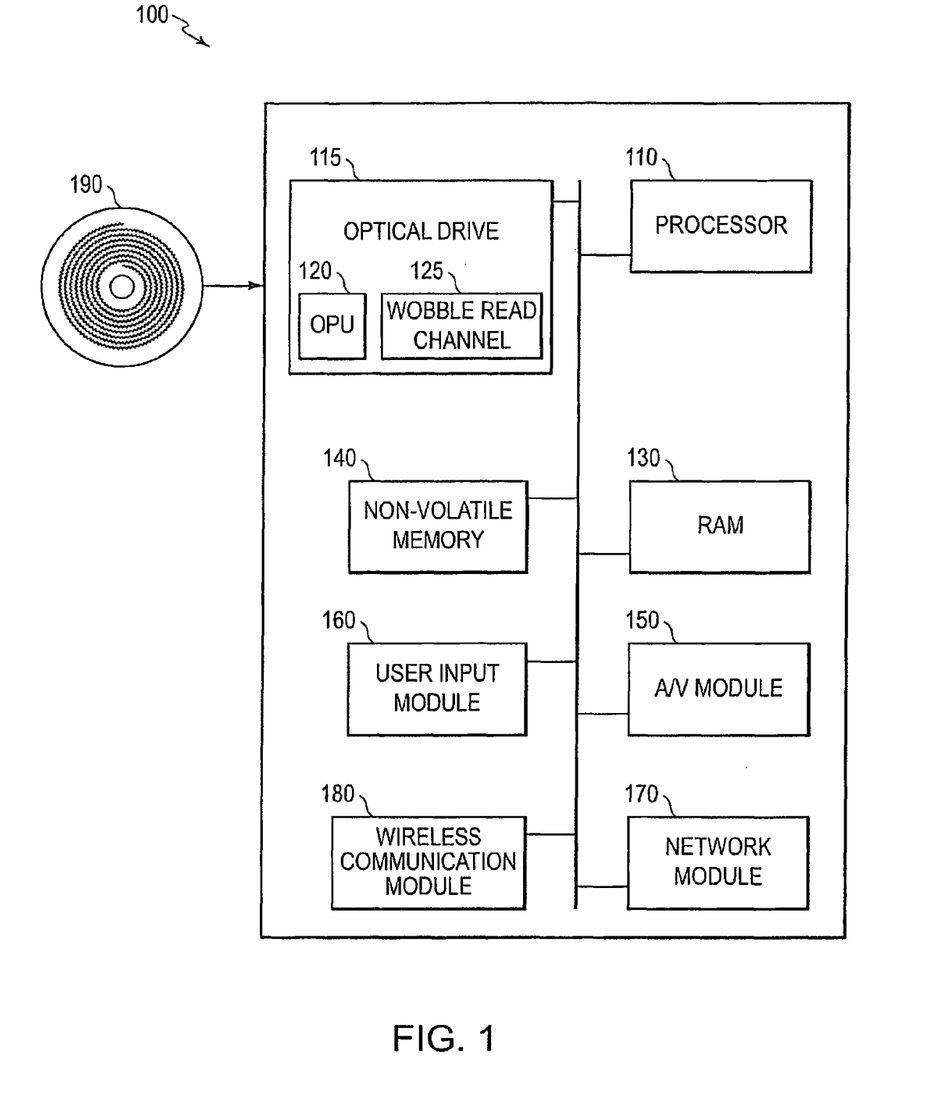
FIG. 1 shows a block diagram of an exemplary medium device.

FIG. 1 shows a block diagram of an exemplary medium device and an exemplary optical disc. The medium device 100 can include a processor 110, an optical drive 115, a RAM unit 130, and a non-volatile memory 140. These elements can be coupled together as shown in FIG. 1.

The optical drive 115 can include an optical pick-up unit (OPU) 120. The OPU 120 can receive signals corresponding to various information, such as timing information, address information, disc information, user data, and the like, in the optical disc 190. Further, the OPU 120 can record user information on the optical disc 190 based on the various information.

As shown in FIG. 1, the optical disc 190 can generally include a spiral recording track, for example, in the form of a spiral groove adjacent to a spiral land. On the spiral recording track, user data can be stored on a recording layer by forming either data pits or data marks. The data pits or data marks can be preferred to have a substantially constant linear length to improve the data storage capability of the optical disc 190. To assist maintaining constant length of data marks or data pits, timing and address information can be embedded in the spiral groove and the spiral land during disc manufacturing. In an example, the timing information can be embedded by wobbling the spiral groove and the spiral land. Further, address information and disc information can be embedded by various techniques, such as land pre-pits, wobble phase modulation, and the like.

The OPU 120 can be configured to detect the embedded information. Specifically, the OPU 120 may direct a laser beam to a location of the optical disc 190. The laser beam can be reflected from the location of the optical disc 190. The reflected laser beam may have light properties that can correspond to information embedded at the location of the optical disc 190. The light properties can be detected by a light detector (not shown) of the OPU 120. Further, the light detector of the OPU 120 may convert the light properties to various electrical signals, such as a push-pull signal, and the like, for other components of the optical drive 115 to extract the various information, for example.

In addition, the OPU 120 can be configured to record user data on the optical disc 190 according to the extracted information, such as timing information, address information, disc information, and the like. For example, the OPU 120 may direct a recording laser beam to a recording location of the optical disc 190. The recording laser beam may have a laser power determined according to the extracted disc information, and may have a turn-on time determined according to the extracted timing information. In addition, the recording location can be determined based on the extracted address information, for example.

The optical drive 115 can further include a wobble channel 125 that can be configured to detect wobbles from an electrical signal, such as a push-pull signal, converted by the light detector in order to extract the embedded information. However, due to various reasons, such as disturbances, defects, noises, and the like, the wobble channel 125 may inaccurately detect the wobbles. In addition, settings of the optical drive 115 can also affect wobble detection. Generally, the OPU 120 and/or the wobble channel 125 can be tunable according to various settings. An optimum setting may enable the wobble channel 125 to detect wobbles with a reduced error rate, such as a reduced bit-error-rate (BER). The optimum setting of the OPU 120 and/or the wobble channel 125 can be determined by a calibration process. In a conventional technique, the optimum setting can be determined based on measuring BERs corresponding to the various settings, which can be time consuming.

According to the disclosure, the wobble channel 125 can include a quality metric unit. The quality metric unit can obtain quality metric values corresponding to the various settings with reduced time. The quality metric values can be used to determine an optimum setting of the OPU 120 and/or the wobble channel 125.

The processor 110 of the medium device 100 can execute system and application codes. The non-volatile memory 140 can hold information even when power is off. Therefore, the non-volatile memory 140 can be used to store system and application codes, such as firmware. The RAM unit 130 is readable and writable. Generally, the RAM unit 130 can have a fast access speed. It can be preferred that the data and the codes are stored in the RAM unit 130 during operation, such that the processor 110 can access the RAM unit 130 for the codes and the data instead of the non-volatile memory 140.

It should be understood that the medium device 100 may include more than one processor 110. Further, the non-volatile memory 140 may include various non-volatile memory devices, such as battery backup RAM, read-only memory (ROM), programmable ROM (PROM), flash PROM, electrical erasable PROM (EEPROM) magnetic storage, optical storage, and the like. Some non-volatile memory 140 can be updated, such as various types of PROM. The RAM unit 130 may also include various RAM devices, such as DRAM, SRAM, and the like.

For ease and clarity of description, the embodiments are presented with a bus type architecture, however, it should be understood that any other architectures can also be used to couple components inside medium device 100.

Additionally, the medium device 100 may include a user input module 160. The user input module 160 may enable the user to control operations of the medium device 100. The user input module 160 may include various user input devices, such as keyboard, mouse, touch screen, and the like. In addition, the user input module 160 may include interfaces that can enable external user input devices.

In an embodiment, the medium device 100 may include a video/audio module 150. The video/audio module 150 may include various video and audio devices, such as microphone, display screen, and the like. In addition, the video/audio module 150 may include interfaces that can enable external video and audio devices. The video/audio module 150 can be utilized to play video data/audio data that can be stored in the optical disc 190.

In another embodiment, the medium device 100 may include a network module 170. Furthermore, medium device 100 may include wireless communication module 180. The network module 170 and the wireless communication module 180 may enable the medium device 100 to communicate the data stored in the optical disc 190 to other devices.

Figure 2:
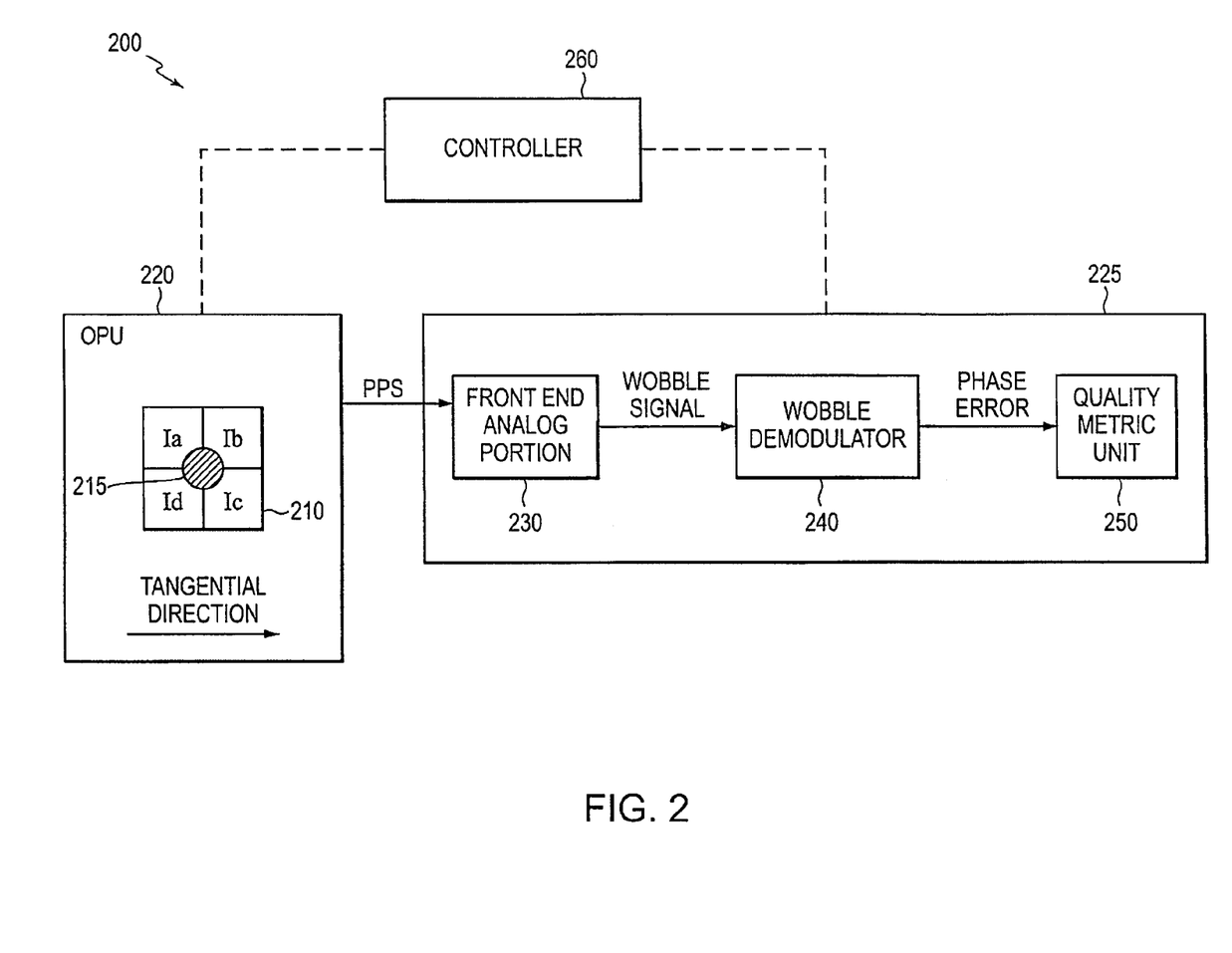
FIG. 2 shows a block diagram 200 of an exemplary wobble channel.

FIG. 2 shows a block diagram of an exemplary wobble channel coupled with an exemplary optical pick-up unit. The wobble channel 225 can include a front-end analog portion 230, a wobble demodulator 240 and a quality metric unit 250. These elements can be coupled as shown in FIG. 2.

The optical pick-up unit 220 may include a detector, such as a quadrant photo detector 210 shown in FIG. 2. The quadrant photo detector 210 may detect a light beam 215, and generate various signals, such as a push-pull signal (PPS), based on the light beam 215. The push-pull signal can correspond to a wobbled recording track, such as wobbled groove and land fields, on a memory medium.

The front-end analog portion 230 may receive the push-pull signal, regulate the push-pull signal, and output a wobble signal. The front-end analog portion 230 may regulate the push-pull signal with analog techniques for various purposes, such as amplification, compensation for offsets, adjusting appropriate dynamic range, and the like. For example, the front-end analog portion 230 may include an offset loop that can be used to adjust the offsets of the push-pull signal. For another example, the front-end analog portion 230 may include a gain loop that can adjust an amplifier gain to regulate the push-pull signal to an appropriate dynamic range. Therefore, the wobble signal, which is outputted from the front-end analog portion 230, can be suitable for subsequent circuit components to handle.

The wobble demodulator 240 can receive the wobble signal, and can extract the timing information from the wobble signal. More specifically, the wobble demodulator 240 may include a phase lock loop that can lock an internal clock signal to the wobble signal. Then, the internal clock signal can be used to enable components of an optical drive, such as the optical drive 115, to extract information and record user data corresponding to the wobbled recording track. Therefore, the extraction and recording operations may depend on a locking quality of the internal clock signal to the wobble signal.

In an example of DVD+R, the internal clock signal can be used to determine wobble phase modulation to decode the various information embedded in the wobble, such as address information, disc information, and the like. When the internal clock signal has a phase difference from the wobble signal, the phase difference may direct to erroneously determine the wobble phase modulation, which can result in wrong decoding the various information embedded in the wobble.

In an example of DVD-R, the internal clock signal can be used to generate a sampling window to detect land pre-pits to decode the various information embedded in the wobble. When the internal clock signal has a phase difference from the wobble signal, the phase difference may shift the sampling window from locations of the land pre-pits, and result in no detection of land pre-pits.

Generally, a locking quality of a phase lock loop can be measured by a phase error. The phase error can measure a phase difference of the internal clock signal and the wobble signal, for example. The phase lock loop can pull the phase error towards a stable point, such as zero phase error. However, the phase error may shift from the stable point, due to various reasons, such as noises, disturbances, interferences, defects, and the like. The shifted phase error may result in errors in the decoded information. Additionally, settings of the OPU 220 and the wobble channel 225 can also affect the locking quality. For example, some settings may enable the OPU 220 and/or the wobble channel 225 to resist certain noises and disturbances, therefore the decoded information may have a reduced number of errors. For another example, some settings may enable the OPU 220 and/or the wobble channel 225 to respond quickly to a shifted phase error, therefore, the decoded information may have a reduced number of errors. An optimum setting of the OPU 220 and/or the wobble channel 225 can be determined by a calibration process. In a calibration process, the optimum setting can be determined based on measuring bit-error-rate (BER) of the decoded information, which can be time consuming.

According to the disclosure, the wobble channel 225 may include a quality metric unit 250 that can obtain a quality metric value for a setting based on a phase error of the internal clock and the wobble signal or a component of the phase error, such as an in-phase component, a quadrature component, and the like. Further, the quality metric values can be used to determine an optimum setting, for example having a best quality metric value.

Optionally, a controller 260 can be coupled to the OPU 220 and the wobble channel 225. The controller 260 can arrange the OPU 220 and the wobble channel 225 according to a setting, and obtain a quality metric value corresponding to the setting. Further, the controller 260 can determine an optimum setting based on the obtained quality metric values.

In an embodiment, the controller 260 can be coupled to the OPU 220 and the wobble channel 225 during a system integration of an optical drive. The controller 260 may determine an optimum setting corresponding to a category of memory medium. The category may include a medium type, such as DVD-R, DVD+R, CD, HD-DVD, and the like. The category may also include a medium manufacture. The optimum setting corresponding to the category can be included in a firmware. Therefore, when a memory medium has been identified by the optical drive, a corresponding optimum setting can be read from the firmware and the optical drive can be arranged according to the optimum setting.

In an embodiment, the front-end analog portion 230, the wobble demodulator 240 and the quality metric unit 250 can be implemented as circuit modules in an integrated circuit (IC) chip. The IC chip may further include other circuit modules, such as controller module, encoder module, decoder module, memory module, network module, and the like. The IC chip can be coupled with the OPU 220 in an optical recording device. The IC chip with the quality metric unit 250 may enable the optical recording device to determine an optimum setting according to the disclosure.

Figure 3A:
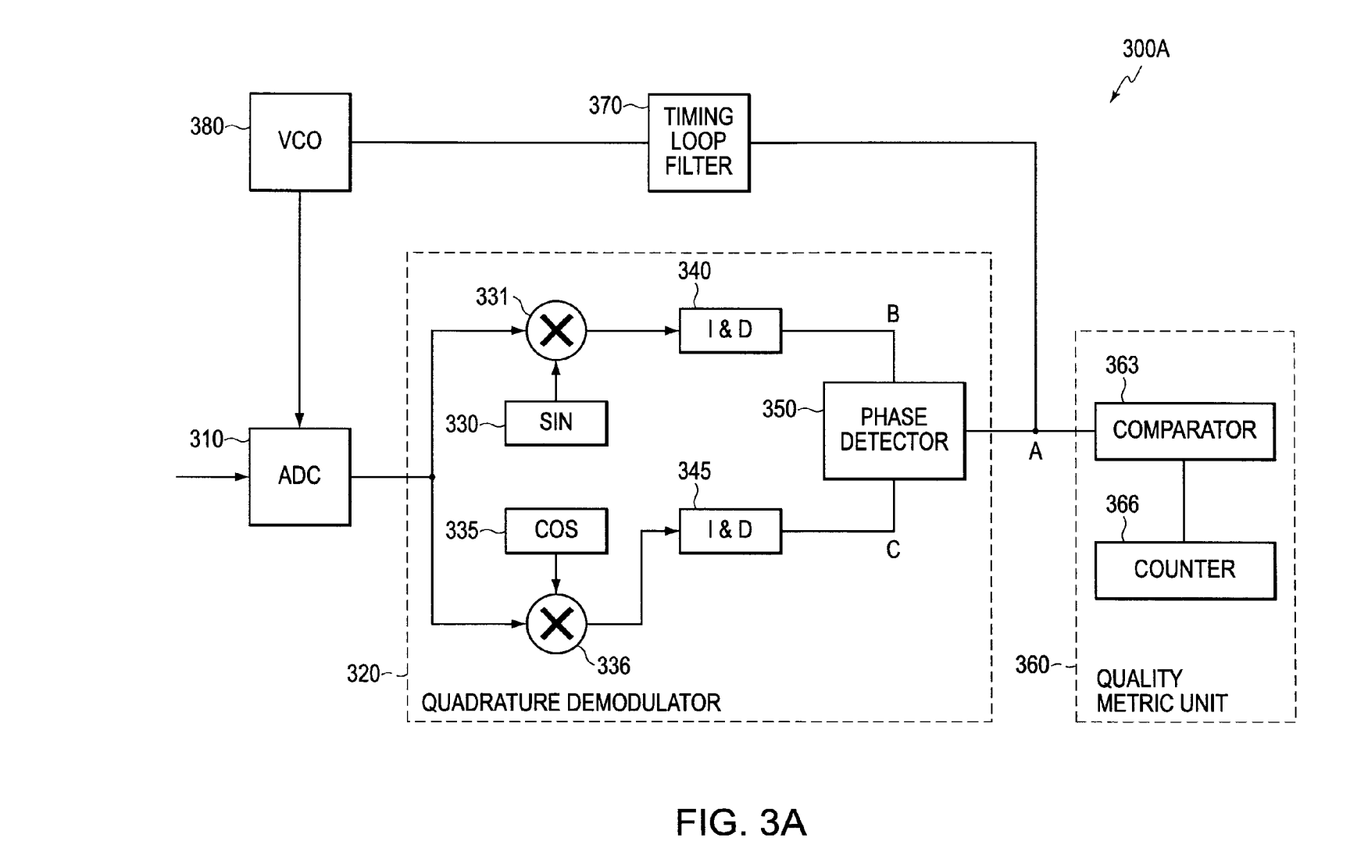
FIGS. 3A-C show block diagrams 300A-300C of exemplary configurations of a wobble demodulator coupled to a quality metric unit.
Figure 3B:
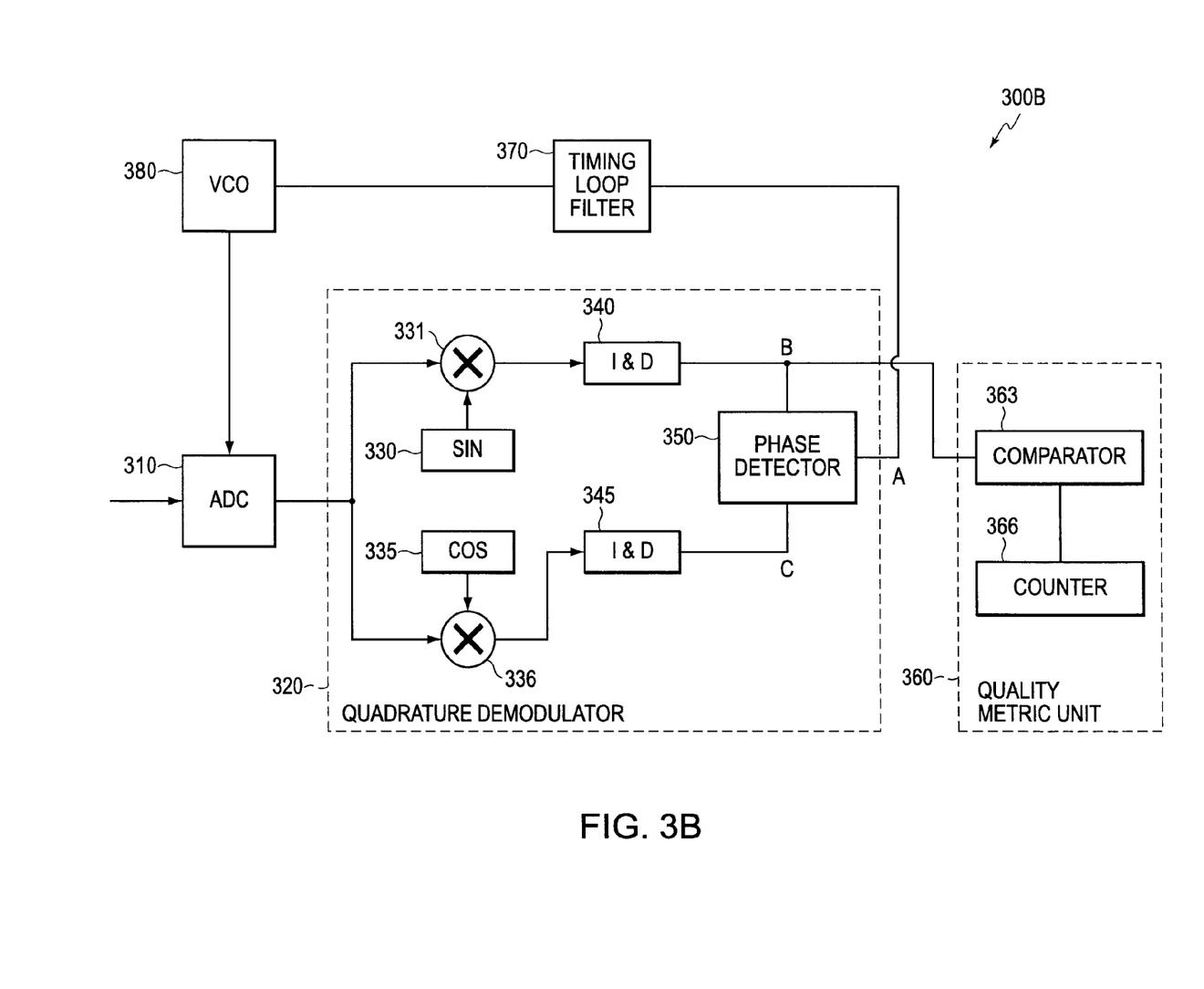
Figure 3C:
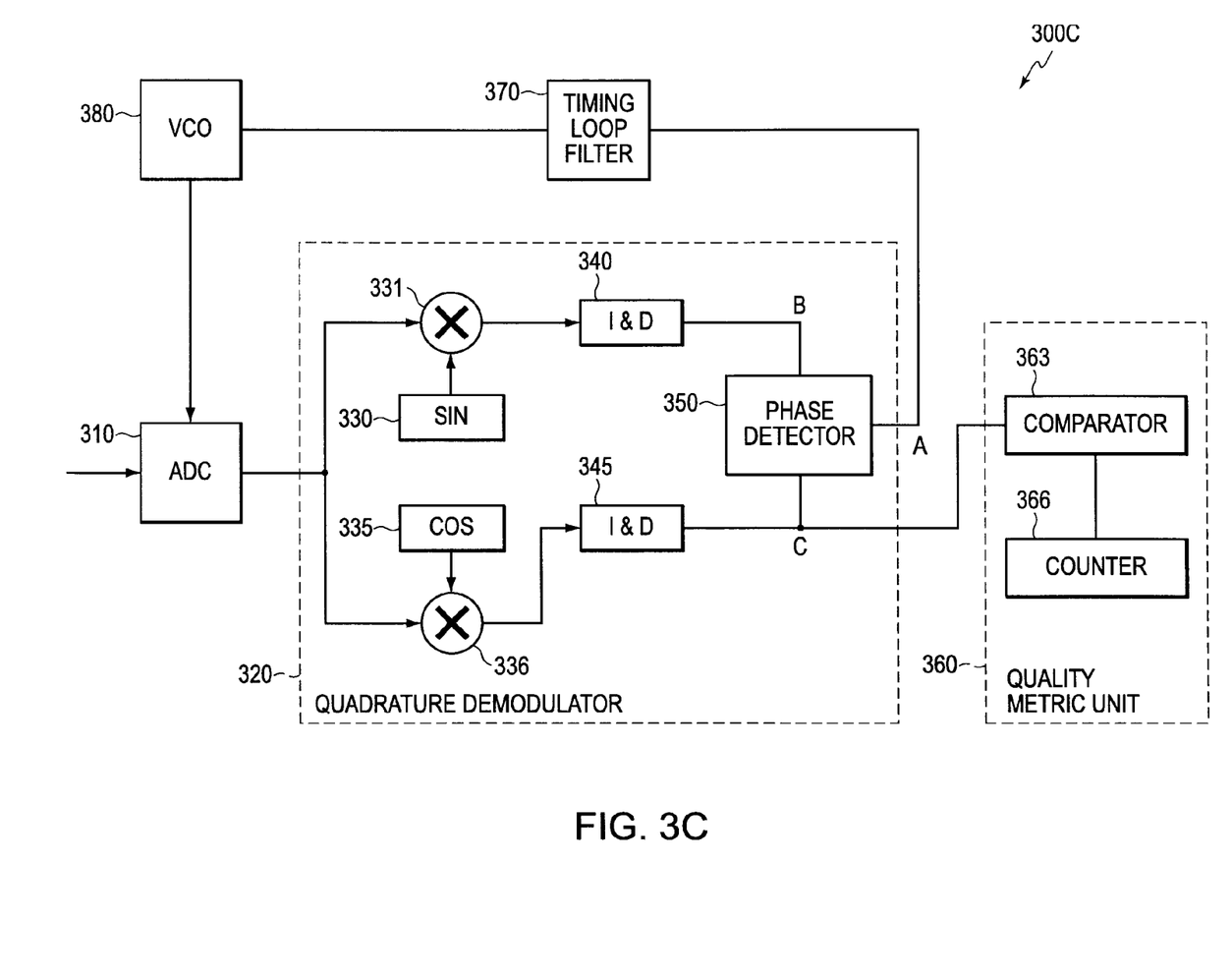

FIGS. 3A-3C show block diagrams of exemplary configurations of an exemplary wobble demodulator coupled to an exemplary quality metric unit in an optical drive. The wobble demodulator, which can be implemented as a timing loop, can include an analog-to-digital converter (ADC) 310, a quadrature demodulator 320, a timing loop filter 370, and a voltage control oscillator (VCO) 380. These elements can be coupled as shown in FIGS. 3A-3C.

The ADC 310 can convert the wobble signal into a discrete wobble signal based on a sampling clock signal from VCO 380. The quadrature demodulator 320 can be configured to compare the discrete wobble signal with an internal oscillator signal and output a phase error signal.

The timing loop filter 370 can receive the phase error signal, and output a voltage signal based on the phase error signal. The voltage signal can be received by the VCO 380 to generate the sampling clock signal.

The quadrature demodulator 320 may include two parallel signal processing paths to calculate a quadrature component and an in-phase component of the phase difference. The path to calculate the in-phase component can include a sine signal generator 330, a multiplier 331 and an integrator and dump 340. The path to calculate the quadrature component can include a cosine signal generator 335, a multiplier 336 and an integrator and dump 345. Subsequently, the quadrature and the in-phase components can be used by a phase detector 350 to generate the phase error.

During an exemplary operation, ADC 310 can use the sampling clock signal from the VCO 380 to sample the wobble signal to obtain the discrete wobble signal. On the in-phase path, the multiplier 331 can use the discrete wobble signal to multiply a sine signal of the internal clock. Further, the multiplied signal can be integrated over a period by the integrator and dump 340 to obtain the in-phase component.

On the quadrature path, the multiplier 336 can use the discrete wobble signal to multiply a cosine signal of the internal clock. Further, the multiplied signal can be integrated over a period to by the integrator and dump 345 to obtain the quadrature component. Subsequently, the quadrature component and the in-phase component can be used by the phase detector 350 to detect the phase error, for example using an arctangent function.

Further, the timing loop filter 370 may obtain a feedback portion based on the phase error. The feedback portion can be used by the VCO 380 to adjust the sampling clock signal, such as its phase and frequency. Therefore, the ADC 310 can use the sampling clock signal to sample the wobble signal with a desired frequency and a desired phase. In an example, the wobble demodulator can be configured to lock the wobble signal with the internal clock with zero phase error.

The internal clock can be used by other components of an optical drive to control operation timing. Therefore, the other components can operate corresponding to the wobble signal as a result that the internal clock is locked with the wobble signal. However, due to various reasons, such as noises, interferences, disturbances, and the like, the phase error of the wobble signal and the internal clock can be shifted from, for example zero. The non-zero phase error may result in errors, such as detecting errors of the embedded information in the wobbles.

The quality metric unit 360 may obtain a quality metric value based on the phase error or components of the phase error. FIG. 3A shows a configuration that the quality metric unit 360 may obtain the quality metric value based on the phase error detected by the phase detector 350. FIG. 3B shows a configuration that the quality metric unit 360 may obtain the quality metric value based on an in-phase component of the phase error, which can be outputted by the integrator and dump 340. FIG. 3C shows a configuration that the quality metric unit 360 may obtain the quality metric value based on a quadrature component of the phase error, which can be outputted by the integrator and dump 345.

In an embodiment, the quality metric unit 360 may include a comparator 363, and a counter 366. The comparator 363 may compare the phase error or a component of the phase error to a threshold, such as a programmable threshold, to determine if the phase error or the component of the phase error exceeds the programmable threshold. In an example, the quality metric unit 360 may also include an absolute (ABS) module which can obtain an absolute value of the phase error or the component of the phase error. Therefore, the absolute value of the phase error or the absolute value of the component of the phase error can be compared with the programmable threshold. In another example, the quality metric unit 360 may include a filter module, which can filter out negative values, for example of an in-phase component for a medium, such as a non-DVD+type medium, or a medium that is not strictly phase modulated. Therefore, positive values of the in-phase component can be compared with the programmable threshold to obtain the quality metric. Alternatively, the comparator 363 may compare the in-phase component to zero and the programmable threshold.

The counter 366 may obtain a counted number based on the comparison results of the comparator 363. In an embodiment, the counter 366 may count a number of occurrences that the absolute value of the phase error or the absolute value of the component of the phase error exceeds the programmable threshold. In another embodiment, the counter 366 may count a number of occurrences when the in-phase component is greater than zero and less than the programmable threshold. The counted number may be stored in a memory medium, such as a RAM, correspond to a current setting of the optical drive. Further, the counted number can be used to determine if the current setting can be an optimum setting, for example with a smallest counted number at a specific threshold, for the optical drive.

Generally, an optical drive can be tunable according to various settings. In an example, the optical drive may include an OPU that may have various tunable parameters, such as focus offset, radial offset, collimator position, tilt angle, and the like. In another example, the optical drive may include a front-end analog portion that may have various tunable parameters, such as attack-rate, decay-rate, and the like. In another example, the optical drive may include a timing loop filter for a timing loop that can include various tunable parameters, such as phase update gain, frequency update gain, and the like. Some tunable parameters can be tuned to enable the optical drive to resist certain noises, disturbances, interferences, and the like. Some tunable parameters can be tuned to enable the optical drive to quickly relock the internal signal to the wobble signal.

Figure 4:
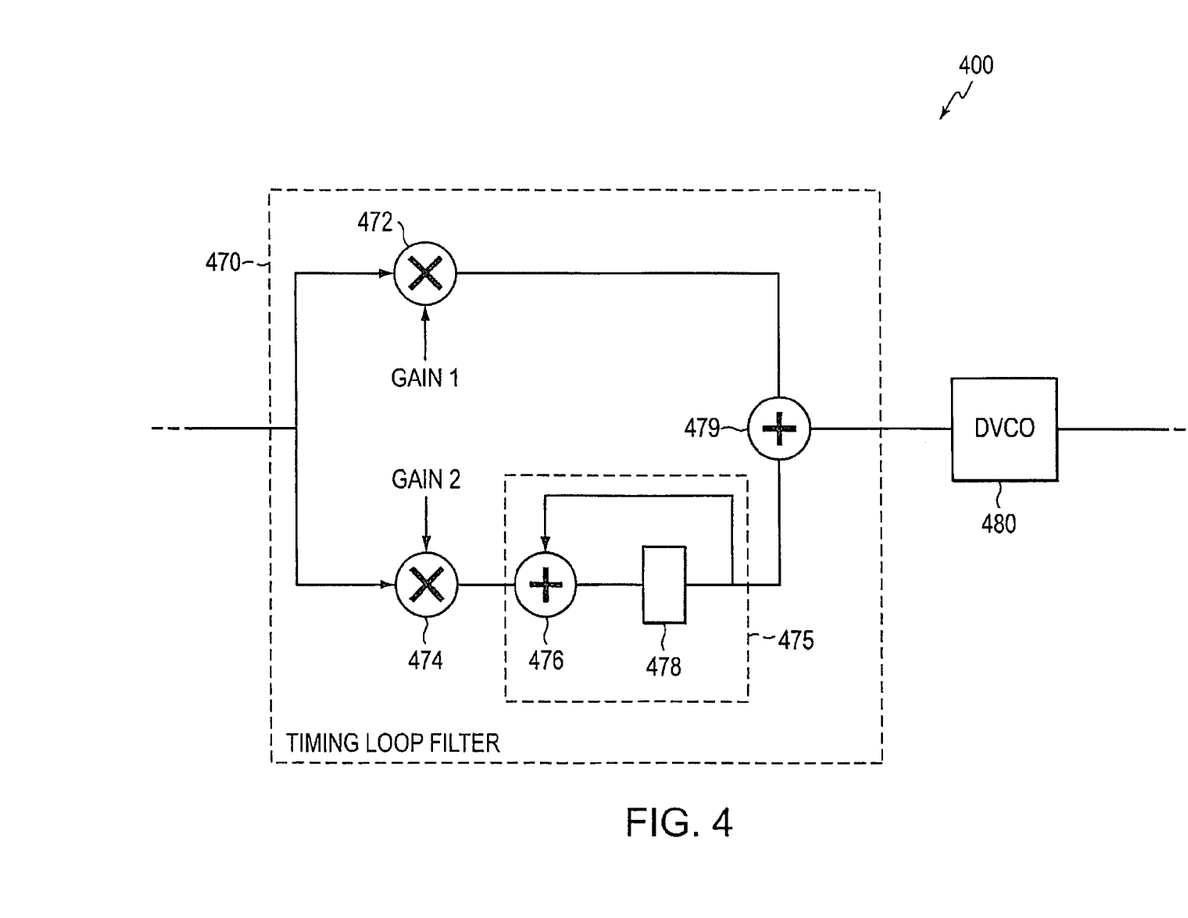
FIG. 4 shows a block diagram 400 of an exemplary timing loop filter.

FIG. 4 shows a block diagram of an exemplary timing loop filter coupled with an exemplary digital voltage control oscillator (DVCO). The timing loop filter 470 can include a phase path and a frequency path to generate a control signal for the DVCO 480. The phase path can include a first multiplier 472 to generate a phase component. The frequency path can include a second multiplier 474 and an integrator 475 to generate the frequency component. The integrator 475 may include a first adder 476 and a register 478. Further, the timing loop filter 470 can include a second adder 479 to combine the phase component and the frequency component to generate the control signal. These elements can be coupled as shown in FIG. 4.

The first multiplier 472 can multiply the phase error with a phase update gain to generate the phase component. The phase update gain can be tunable. For example, the phase update gain can be tunable according to one of 16 values P0-P15.

The second multiplier 474 can multiply the phase error with a frequency update gain. Then, the integrator 475 may integrate the multiplied phase error to generate the frequency component. More specifically, the first adder 476 can add the multiplied phase error to a previous frequency component to generate a current frequency component. The register 478 can be configured to buffer the current frequency component, and hold the previous frequency component. The frequency update gain can be tunable. For example, the frequency update gain can be tunable according to one of 16 values F0-F15.

Further, the second adder 479 can combine the phase component and the frequency component to generate the control signal for the DVCO 480. In an embodiment, the DVCO 480 may include a digital representation of a voltage signal. The control signal can be used to adjust the digital representation of the voltage signal. The DVCO 480 may further include a digital to analog converter (DAC) (not shown). The DAC can convert the digital representation to the voltage signal. Further, the voltage signal can be used to control a voltage control oscillator (VCO) to generate the sampling clock accordingly.

Figure 5:
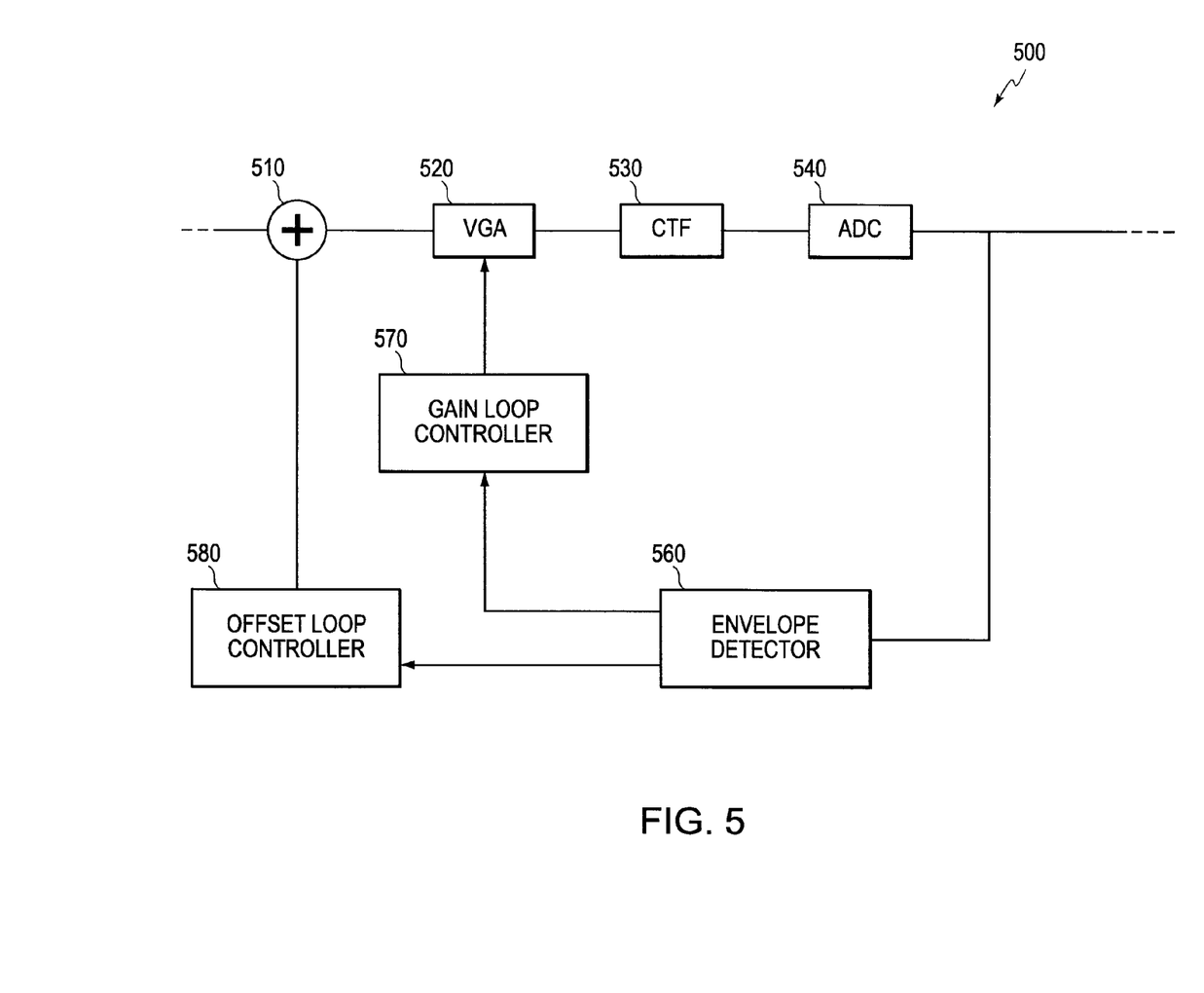
FIG. 5 shows a block diagram 500 of an exemplary front-end portion of an exemplary wobble channel.

FIG. 5 shows a block diagram of an exemplary front-end analog portion. The front-end analog portion may include an offset adder 510, a variable gain amplifier (VGA) 520, a continuous time filter (CTF) 530 and an analog to digital converter (ADC) 540. Additionally, the front-end analog portion may include detector and controller modules, such as an envelope detector 560, an offset loop controller 580 and a gain loop controller 570. These elements can be coupled as shown in FIG. 5.

The offset adder 510, the VGA 520, and the CTF 530 can regulate a received analog signal to have desired properties. For example, the offset adder 510 can adjust the analog signal with an offset that can be provided by the offset loop controller 580. The VGA 520 can amplify the analog signal with a gain that can be controlled by the gain loop controller 570. The CTF 530 can be configured to truncate an input noise bandwidth of the analog signal, for example.

The ADC 540 can obtain a discrete wobble signal by sampling the regulated analog signal. The envelope detector 560 can be configured to detect error signals, such as an offset error signal, a gain error signal, from the discrete wobble signal. The offset loop controller 580 may generate the offset based on the offset error signal. In an embodiment, the offset loop controller 580 may include a digital representation of the offset, and a digital to analog converter that can convert the digital representation to the offset in an analog form. The gain loop controller 570 may generate a gain control signal based on the gain error signal.

The front-end analog portion can also include various tunable parameters, such as attack-rate for an increasing slope of the discrete wobble signal, decay-rate (Tau) for a decreasing slope of the discrete wobble signal, and the like. The various tunable parameters of the front-end analog portion can also affect error rate of detected information from the wobble signal. According to the disclosure, the quality metric unit can be used to determine an optimum setting of the front-end analog portion. For example, a system engineer may use the quality metric unit to determine an optimum Tau for an optical drive.

Figure 6:
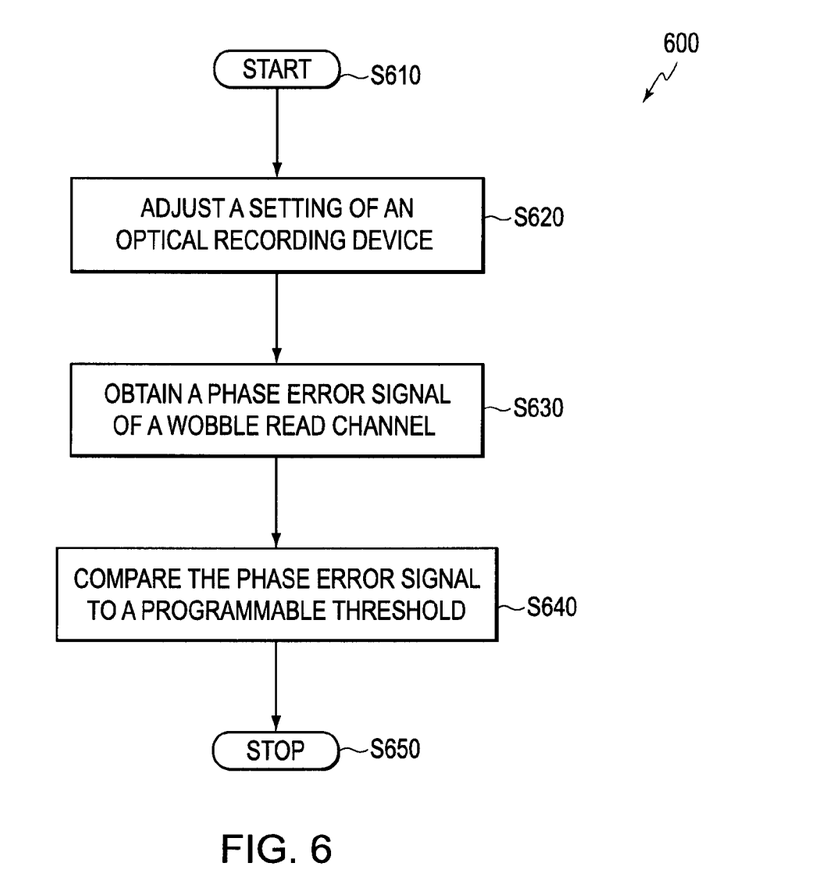
FIG. 6 shows a flowchart 600 outlining an exemplary process for calibrating a wobble channel.

FIG. 6 shows a flow chart outlining an exemplary calibration process using the disclosed quality metric. The process starts at step S610, and proceeds to step S620.

In step S620, an optical recording device can be configured according to a setting. In an embodiment, the optical recording device may include a controller that can configure the optical recording device according to the setting. The setting may include values for various tunable parameters, such as phase update gain, frequency update gain, attack-rate, decay-rate (Tau), and the like. Then, the process proceeds to step S630.

In step S630, a phase error signal of a wobble channel can be obtained. In an example, the wobble channel may include a phase lock loop, which can lock an internal clock signal to a wobble signal. The phase lock loop may obtain a phase error signal of the internal clock signal to the wobble signal. The phase error signal can be used to determine a quality metric value for the setting.

Alternatively, components of the phase error signal, such as an in-phase component, a quadrature component, and the like, can be used to determine a quality metric value for the setting. The process then proceeds to step S640.

In step S640, the phase error signal can be compared to a programmable threshold to obtain the quality metric value for the setting. In an example, a number of occurrences that the phase error signal exceeds the programmable threshold can be counted. Further, an optimum setting can be determined based on the counted number. For example, a setting with a smallest counted number at a specific threshold may be determined as an optimum setting.

Alternatively, components of the phase error signal can be compared to a programmable threshold to obtain the quality metric for the setting. In an example, a number of occurrences that an absolute value of an in-phase component is smaller than a threshold can be counted. Further, an optimum setting can be determined based on the counted number. In another example, a number of occurrences that an absolute value of a quadrature component is larger than a threshold can be counted. Further, an optimum setting can be determined based on the counted number. The process then proceeds to step S650 and terminates.

FIGS. 7A-7D show exemplary wobble quality metric characteristics that are based on an in-phase component of a phase error signal. In the FIGS. 7A-7D, the X axis can correspond to a plurality of thresholds for a wobble quality metric unit, and the Y axis can correspond to a quality metric value, such as a percentage of wobble quality metric count over a total count. The wobble quality metric count can count a number of occurrences that an absolute value of the in-phase component is smaller than a threshold.

Figure 7A:
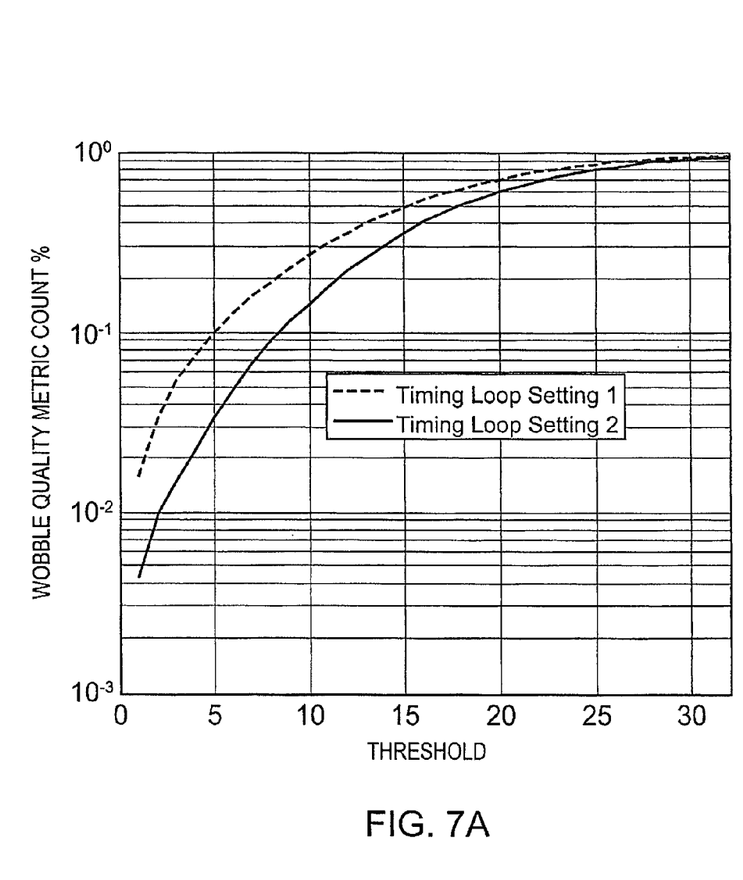
FIGS. 7A-7D show exemplary wobble quality metric characteristics.

FIG. 7A shows exemplary wobble quality metric characteristics for a DVD+R. The DVD+R can be configured according to a first timing loop setting and a second timing loop setting. The wobble quality metric characteristics for the first timing loop setting and the second timing loop setting can be shown by a dash line and a solid line, respectively. As can be seen, the second timing loop setting can obtain a less percentage of the wobble quality metric count.

Figure 7B:
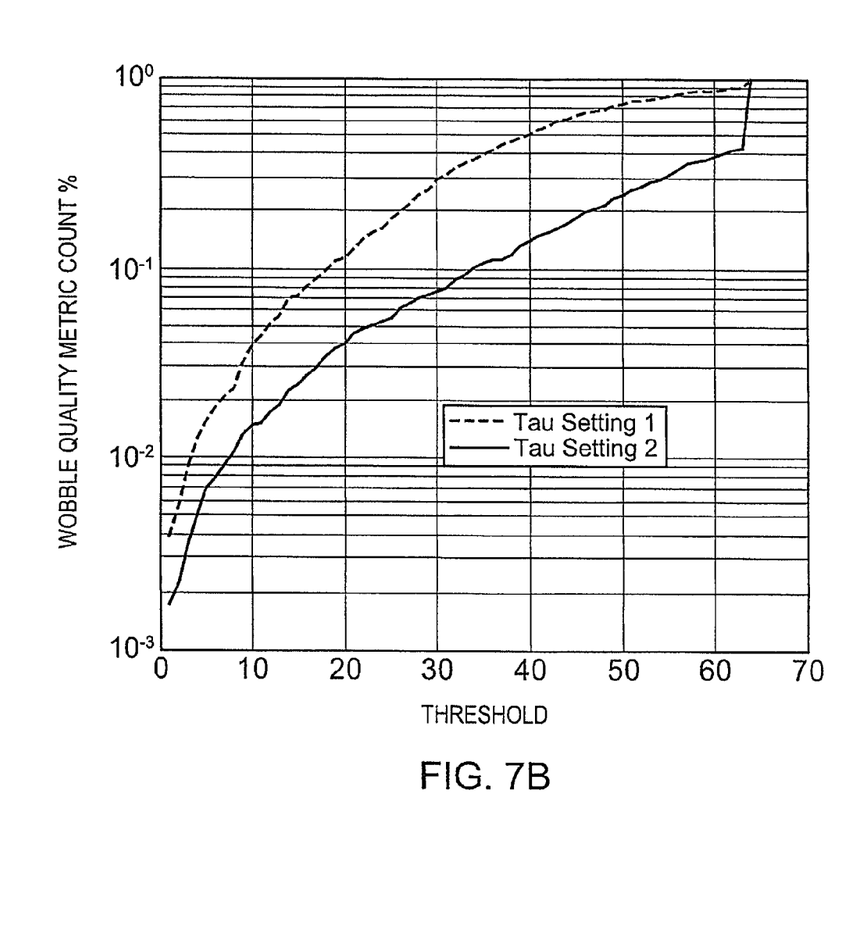

FIG. 7B shows exemplary wobble quality metric characteristics for a DVD-R. The DVD-R can be configured according to a first Tau setting and a second Tau setting. The wobble quality metric characteristics for the first Tau setting and the second Tau setting can be shown by a dash line and a solid line, respectively. As can be seen, the second Tau setting can obtain a less percentage of wobble quality metric count.

Figure 7C:
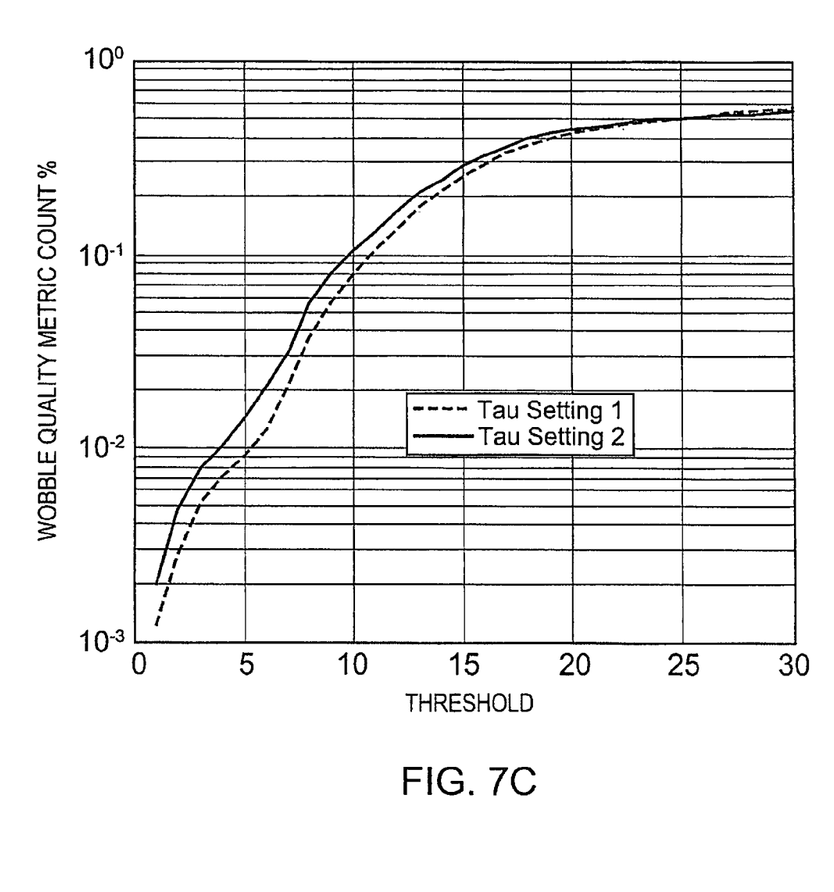

FIG. 7C shows exemplary wobble quality metric characteristics for a CD. The CD can be configured according to a first Tau setting and a second Tau setting. The wobble quality metric characteristics for the first Tau setting and the second Tau setting can be shown by a dash line and a solid line, respectively. As can be seen, the first Tau setting can obtain a less percentage of the wobble quality metric count.

Figure 7D:
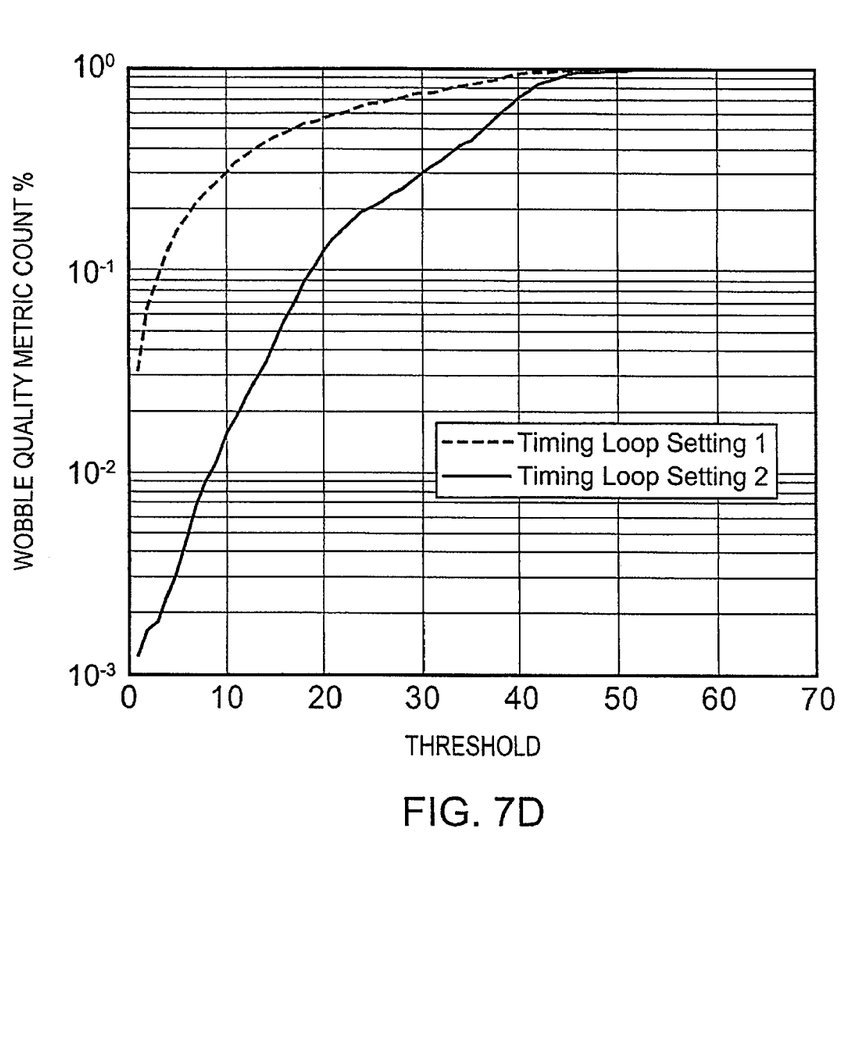

FIG. 7D shows exemplary wobble quality metric characteristics for a HD-DVD. The HD-DVD can be configured according to a first timing loop setting and a second timing loop setting. The wobble quality metric characteristics for the first timing loop setting and the second timing loop setting can be shown by a dash line and a solid line, respectively. As can be seen, the second timing loop setting can obtain a less percentage of the wobble quality metric count.

According to an aspect of the disclosure, the optimum setting can be determined based on the wobble quality metric characteristics, such as the curves in FIGS. 7A-7D, which can include quality metric values corresponding to multiple threshold values. Additionally, the optimum setting can be determined based on comparing quality metric values for a single threshold value, for example threshold 20 in FIG. 7A.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for calibrating an optical recording device, comprising:
   receiving a first signal corresponding to a wobbled track of a memory medium;

adjusting offsets of the first signal by a front end analog portion of the optical recording device;

tuning at least a decay-rate of the front end analog portion;

phase-locking a second signal to the first signal, the second signal being used to extract embedded information from the wobbled track; and determining an optimum setting of the optical recording device based on a locking quality of the first signal and the second signal.

2. The method according to claim 1, further comprising:

configuring the optical recording device according to a plurality of settings;

measuring quality metric values that represent the locking quality of the first signal and the second signal corresponding to the plurality of settings; and determining the optimum setting from the plurality of settings based on the quality metric values.

3. The method according to claim 2, wherein the plurality of settings comprise at least one of optical pickup unit (OPU) settings and wobble channel settings.

4. The method according to claim 2, wherein the plurality of settings comprise at least one of a phase update gain, a frequency update gain, an attack-rate and the decay-rate.

5. The method according to claim 2, wherein measuring the quality metric values further comprises:

obtaining an absolute value of at least one of a phase error and a quadrature component of the phase error of the first signal and the second signal;

comparing the absolute value to a threshold; and counting a number of occurrences that the absolute value exceeds the threshold.

6. The method according to claim 1, wherein the memory medium is at least one of CD, DVD-R, DVD-RW, DVD+R, DVD+RW, HD-DVD and Blu-Ray.

7. The method according to claim 1, wherein the embedded information in the wobbled track is in the form of at least one of wobble phase modulation and land pre-pits.

8. The method according to claim 1, further comprising:

storing the optimum setting for future use with the corresponding memory medium.

9. An optical recording device, comprising:

a wobble channel configured to receive a first signal corresponding to a wobbled track of a memory medium and phase-lock a second signal to the first signal, the second signal being used to extract embedded information from the wobbled track;

a front end analog portion configured to adjust offsets of the first signal and tune at least a decay-rate of the front end analog portion; and a controller configured to determine an optimum setting of the optical recording device based on a locking quality of the phase-locked the first signal and the second signal.

10. The optical recording device according to claim 9, further comprising:

a quality metric unit configured to measure quality metric values that represent the locking quality corresponding to a plurality of settings, wherein the controller is further configured to determine the optimum setting from the plurality of settings based on the quality metric values and configure the optical recording device according to the plurality of settings.

11. The optical recording device according to claim 10, wherein the plurality of settings comprise at least one of optical pickup unit (OPU) settings and wobble channel settings.

12. The optical recording device according to claim 10, wherein the plurality of settings comprise at least one of a phase update gain, a frequency update gain, an attack-rate and the decay-rate.

13. The optical recording device according to claim 10, wherein the quality metric unit is further configured to:

obtain an absolute value of at least one of a phase error and a quadrature component of the phase error of the first signal and the second signal;

compare the absolute value to a threshold; and count a number of occurrences that the absolute value exceeds the threshold.

14. The optical recording device according to claim 9, wherein the memory medium is at least one of CD, DVD-R, DVD-RW, DVD+R, DVD+RW, HD-DVD and Blu-Ray.

15. The optical recording device according to claim 9, wherein the embedded information in the wobbled track is in the form of at least one of wobble phase modulation and land pre-pits.

16. The optical recording device according to claim 9, further comprising:

a memory device configured to store the optimum setting for future use with the corresponding memory medium.

* * * * *